United States Patent [19]

Ishizaki et al.

[11] Patent Number: 4,614,418
[45] Date of Patent: Sep. 30, 1986

[54] DISTANCE DETECTION APPARATUS

[75] Inventors: Akira Ishizaki, Yokohama; Takashi Kawabata, Kamakura; Susumu Matsumura, Yokohama, all of Japan

[73] Assignee: Canon Kabushiki Kaisha, Tokyo, Japan

[21] Appl. No.: 635,743

[22] Filed: Jul. 30, 1984

[30] Foreign Application Priority Data

Aug. 10, 1983 [JP] Japan .................................. 58-145065

[51] Int. Cl.⁴ .............................................. G03B 3/10
[52] U.S. Cl. .................................... 354/407; 354/408
[58] Field of Search ................................ 354/400–408

[56] References Cited

U.S. PATENT DOCUMENTS

| 3,274,914 | 9/1966 | Biedermann et al. | 354/408 |
| 4,389,106 | 6/1983 | Maruyama | 354/403 |
| 4,467,187 | 8/1984 | Tsunekawa et al. | 354/402 |
| 4,470,681 | 9/1984 | Johnson | 354/403 |

Primary Examiner—Russell E. Adams
Attorney, Agent, or Firm—Fitzpatrick, Cella, Harper & Scinto

[57] ABSTRACT

A distance detection apparatus detects distances to a far object and a near object in a view field, weights the detected distance information, and selects the distance information on the near object to finally detect the distance.

13 Claims, 13 Drawing Figures

DISTANCE DETECTION APPARATUS

BACKGROUND OF THE INVENTION

1. Field of the Invention

The present invention relates to a distance detection apparatus and more particularly to a distance detection apparatus used for a photographic camera, a television camera or a robot.

2. Description of the Prior Art

Various types of distance detection apparatuses for detecting a distance to an object have been proposed, which detect the distance to the object to focus an imaging lens and used in the photographic camera a television camera. However, when in the case of the distance detection apparatus of, for example, a photographic camera, various objects are present at different distances from the distance detection apparatus. For example, when a mountain is present in a far background of a wide view field, houses are present in front of it and a human is present in front of the houses, an ordinary distance detection apparatus detects, in many cases, an average of the distances to those various objects. Assuming that the houses are at the average distance, the photographic image is focused to the houses and not focused to the human which a photographer wants to be in focus Such a problem is not limited to the distance detection apparatus of a photographic camera. For example, a device which detects a distance to an approaching object to issue an alarm is mounted in an automobile or an aeroplane in order to avoid collision. In such a device, a similar problem is encountered because the objects to be detected should be observed in a relatively wide view field. Thus, if the average distance of the distances to the objects in the view field is detected, a satisfactory result would not be obtained.

One method for resolving the above problem has been proposed in U.S. Pat. No. 4,475,800 assigned to the assignee of the present invention in which a portion of a view field in which an object to be detected is present is selected, that is, a narrow view field which contains only the object to be detected is selected so that the distances to objects not of interest are not detected. In this method, it is necessary to select the narrow view field in accordance with a position of the desired object in the view field and a complex step is required to select the narrow view field. In addition, a complex selection circuit is required. In certain cases, objects at different distances coexist and a definite selection is hard to attain. Accordingly, this method does not provide a complete resolution of the problem.

SUMMARY OF THE INVENTION

It is an object of the present invention to provide a distance detection apparatus which automatically detects a distance to an object to be detected and especially a desired object among various objects.

It is another object of the present invention to provide a distance detection apparatus which rapidly and precisely detects the distance to only a desired object.

It is another object of the present invention to provide a distance detection apparatus which provides distance information on a desired object among various objects which exist in a wide view field.

It is another object of the present invention to provide a distance detection apparatus which provides not only absolute distance information but also relative distance information on a desired object among objects in a view field. The relative distance information means a distance required for an imaging lens which is in a defocus state to be moved into an in-focus state. The absolute distance information and the relative distance information are hereinafter collectively referred to as the information or signal on the distance.

Other objects of the present invention will be apparent from the following description of the invention.

DETAILED DESCRIPTION OF THE PREFERRED EMBODIMENTS

Figure 1:
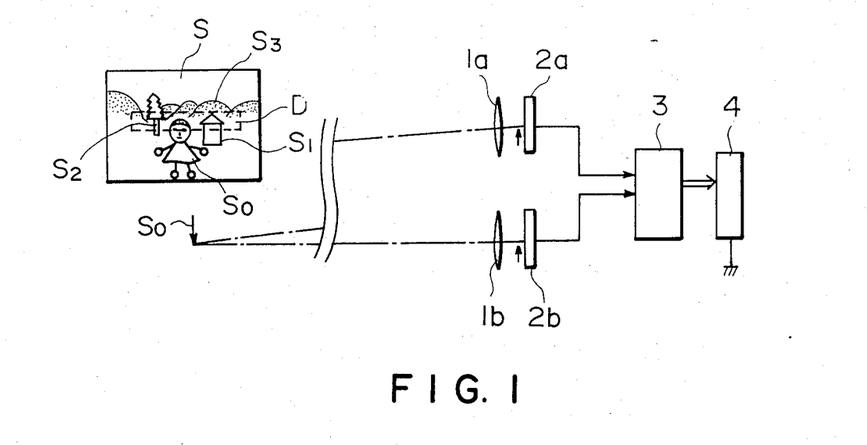
FIG. 1 shows an overall configuration of a distance detection apparatus of the present invention when it is applied to a device for detecting a distance to an object in a photographic camera or a television camera.

Referring to FIG. 1, $S_0$ conceptually denotes a main object, in a sense the distance to which is to be detected. In actuality, other objects exist as a background of the main object $S_0$. For example, when a person stands in a natural background, a house $S_1$, a tree $S_2$ and a mountain $S_3$ as well as the main object $S_0$ are contained in the view field. The objects $S_0$–$S_3$ are at different distances. Numerals 1a and 1b denote focusing lenses spaced by a predetermined base line length, numerals 2a and 2b denote photo-electric conversion elements of line sensors such as CCD's arranged behind the focusing lenses 1a and 1b such that a portion D of the view field S is viewed by photo-sensing planes of the photoelectric conversion elements, numeral 3 denotes an object distance detection processing circuit, and numeral 4 denotes a distance information display device.

Images of the objects $S_0$ and $S_3$ are projected onto the photo-electric conversion elements 2a and 2b by the lenses 1a and 1b, respectively, so that staggered images are formed on the elements in accordance with the distances of the objects $S_0$–$S_3$. The principle thereof is well-known as a triangulation distance detection apparatus.

Figure 2:
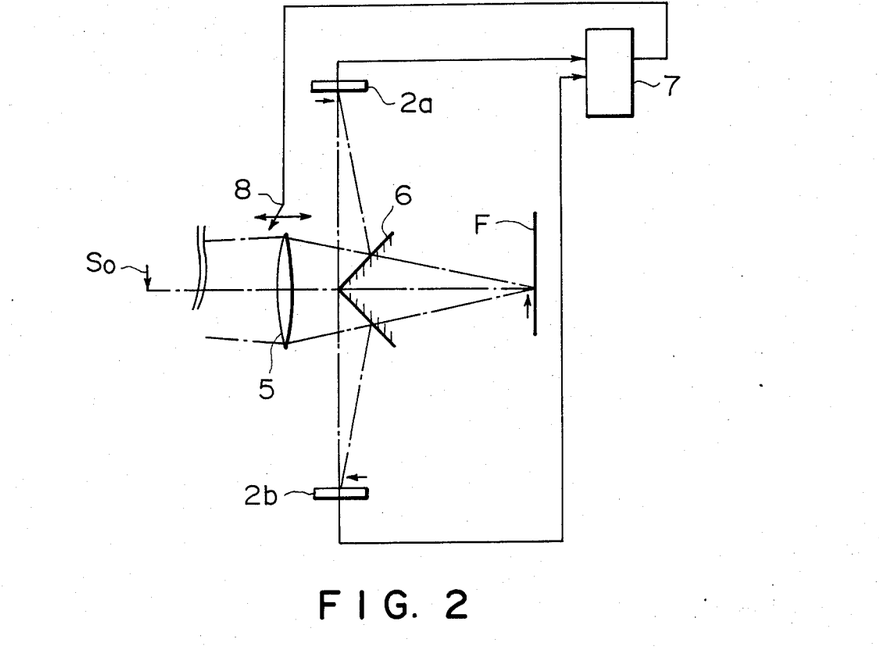
FIG. 2 shows a configuration of another embodiment of the distance detection apparatus of the present invention applied to the device to detect a distance to an object in the photographic camera or a television camera.

FIG. 2 shows a configuration of an embodiment called a TTL distance measuring system. Numerals 2a and 2b denote photo-electric conversion elements similar to those shown in FIG. 1, numeral 5 denotes an imaging lens, numeral 6 denotes a reflection split plate arranged behind the imaging lens 5, and F denotes a photo-sensitive film. The reflection split plate 6 laterally reflects a light flux of the imaging lens to form object images optically equivalent to that on the film F on the elements 2a and 2b arranged at conjugate positions to the film F. Since the same object image is formed on the photo-electric conversion elements 2a and 2b by the split plate 6 and the imaging lens 5 through different light paths, the object images (strictly speaking, defocused images) on the photo-electric conversion elements are staggered in accordance with the defocus amounts from the film F which is an anticipated focusing plane, depending on a current position of the imaging lens. As the imaging lens is moved along an optical axis to bring the focus of the imaging lens to the anticipated focusing plane, the stagger on the photo-electric conversion elements 2a and 2b is eliminated. Numeral 7 denotes a stagger detection or relative distance information detection processing circuit and numeral 8 denotes a lens driver. The reflection split plate 6 is moved out of the imaging light path after the distance measurement operation so that the object images are projected to the film F. A detail thereof is not explained here because it is not directly relevant to the present invention.

Figure 3:
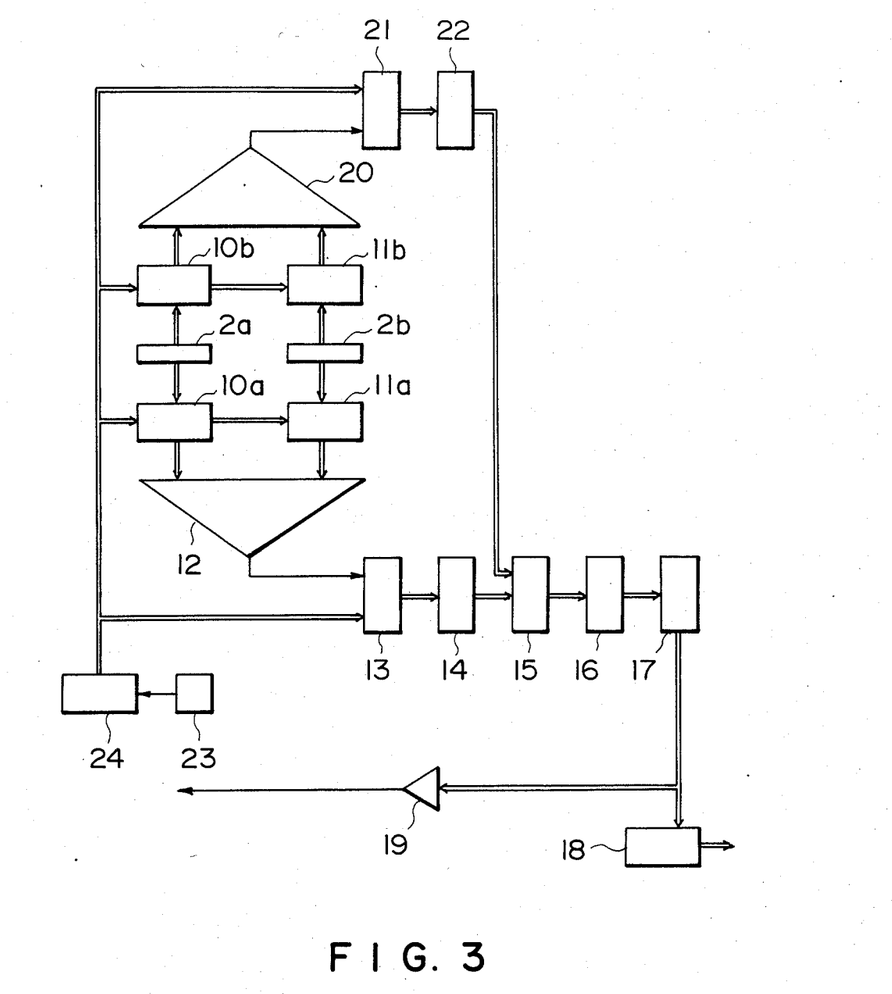
FIG. 3 shows a block diagram of a processing circuit used in the distance detection apparatus of the present invention.

FIG. 3 is a block diagram of an embodiment of the processing circuits 4 and 7. The outputs from the two photo-electric conversion elements 2a and 2b are supplied to four selection gate circuits 10a, 10b, 11a and 11b. The output of the photo-electric conversion element 2a is supplied to the selection gate circuits 10a and 10b, and the output of the photo-electric conversion element 2b is supplied to the selection gate circuits 11a and 11b. The outputs of the selection gate circuits 10a and 11a are supplied to a first correlation detector 12, and the output of the first correlation detector 12 is supplied to a driver 18 which is a digital servo circuit and to a D/A conversion amplifier 19 through a sample-hold circuit 13, an attenuator 14, an adder 15, a maximum value selection circuit 16 and a priority encoder 17 (e.g. Texas Instruments SN 74147). On the other hand, the outputs of the selection gate circuits 10b and 11b are supplied to a second correlation detector 20, and the output of the second correlation detector 20 is supplied to the adder 15 through a sample-hold circuit 21 and an attenuator 22. An output of a counter 24 which counts a pulse of an oscillator 23 is supplied to those circuits as an address (e.g address signals ①-⑤) to be described later.

The photo-electric conversion elements 2a and 2b produce the photo-electric outputs representing intensity information of pixels and those outputs are supplied to the selection gate circuits 10a, 10b, 11a and 11b. In order to determine a stagger, the output of the counter 24 which counts the pulse of the oscillator 23 is supplied to the selection gate circuits 10a, 10b, 11a and 11b as the address signal. For example, the outputs of the photo-electric conversion elements 2a and 2b each comprising seven pixels are sequentially shifted so that three pixels at a time, for each element, are selected by the selection gate circuit 10a and 11a. Namely, at a given address, first to third pixels of the photo-electric conversion element 2a and fifth to seventh pixels of the photo-electric conversion element 2b are selected, and at the next address, second to fourth pixels of the photo-electric conversion element 2a and fourth to sixth pixels of the photo-electric conversion element 2b are selected.

Details of the blocks shown in FIG. 3 are now explained with reference to FIGS. 4 to 9, which also show the selection circuits 10b and 11b, the correlation detector 20, the sample-hold circuit 21 and the attenuator 22.

Figure 4:
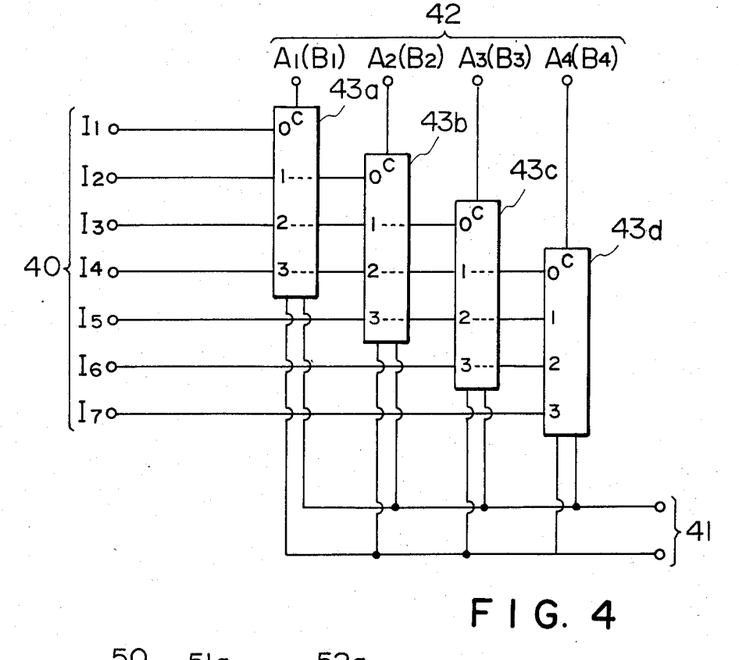
FIG. 4 shows an embodiment of a selection gate circuit used in the processing circuit of FIG. 3.

FIG. 4 shows the selection gate circuit used as the selection gate circuits 10a and 11a. This circuit selects four pixels at a time. The outputs of the photo-electric conversion element 2 from terminals 40 are sequentially shifted by the address signal applied to terminals 41 and selectively outputted at terminals 42. The signals at the terminals 40 are supplied in a shifted manner to the input terminals of the analog switches 43a–43d which are selected by the same address signal, in such a manner that, for example, one of the terminals 40 is connected to the third, second, first and zeroth input terminals of the analog switches 43a–43d, respectively. The outputs at the terminals 42 are sequentially shifted by the address signal in such a manner, for example, that they are connected with the first to fourth input signals at one address and with second to fifth input signals at the next address.

The image signals selected by the selection gate circuits 10a and 11a are applied to the first correlation detector 12 shown in FIG. 3 where the matching or the correlation of three pairs of signals which are shifted from each other is determined.

The selection gate circuits 10a and 11a may be the selection gate circuit shown in FIG. 4. Since the gate circuits 10a and 11a should be constructed to sequentially read out the outputs of the photo-electric conversion elements 2a and 2b, three pixels at a time, the input terminals of the analog switches 43a–43d need not be connected to the input lines. Accordingly, each analog switch 43 may be of the three-input terminal type. An analog switch 43e (not shown) is added and input terminals thereof are connected to the input lines I5–I7. Since a total of five analog switches 43a–43e are sequentially selected, it is necessary to select the analog switches by the 3-bit address signal with one bit being added to the address line 41. A detail thereof is not explained here because it is not directly relevant to the present invention.

Figure 5:
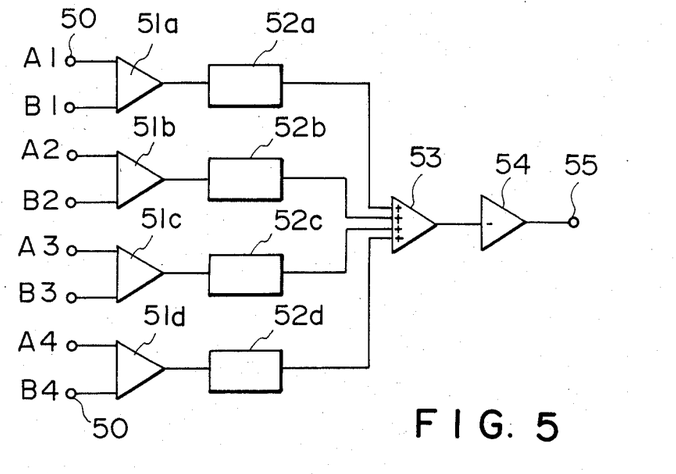
FIG. 5 shows an embodiment of a correlation detector used in the processing circuit of FIG. 3.

FIG. 5 shows an embodiment of the correlation detector of FIG. 3. In the present embodiment, the matching of four pairs of signals is determined. Differences between the paired inputs (A1, B1), . . . (A4, B4) applied to the terminals 50 from the two selection gate circuits 10 and 11 are determined by differential amplifiers 51a–51d and the difference signals are converted to correlation signals by absolute value circuits 52a–52d. The correlation signals are summed by an adder 53 to produce a signal which is minimum when the paired input signals match. The signal is applied to an inverter 54 so that time-serial signals indicating a degree of matching, that is, correlation signal for respective addresses are produced at a terminal 55.

In order to compare the correlation signals, the sample-hold circuit 13 of FIG. 3 samples and holds the correlation signal from the first correlation detector 12 for each address and outputs in parallel signals representing shifts. Since the correlation detector 20 of FIG. 3 correlates the signals, three pixels at a time, the differential amplifier 51d and the absolute value circuit 52d of FIG. 5 are not necessary.

Figure 6:
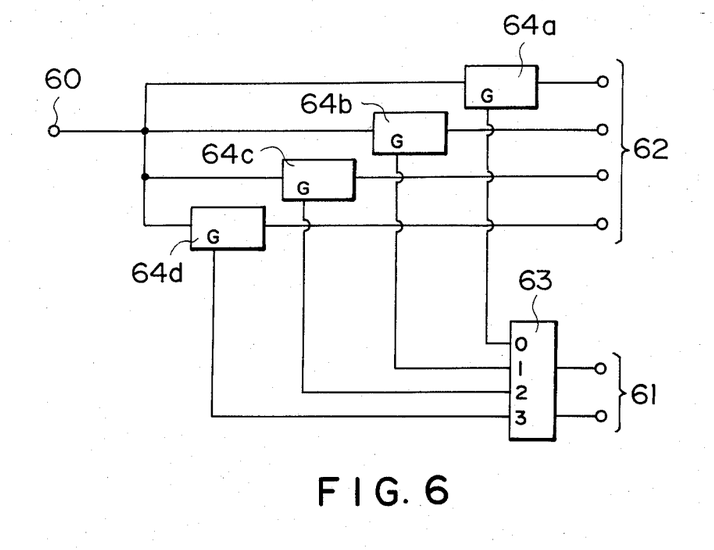
FIG. 6 shows an embodiment of a sample-hold circuit used in the processing circuit of FIG. 3.

FIG. 6 shows an embodiment of the sample-hold circuit of FIG. 3. It outputs in parallel the time-serial signals at output terminals 62 which are correlation signals applied to a terminal 60, in accordance with the address signal applied to terminals 61. A decoder 63 produces a high level output in accordance with the address signal to activate one of sample-hold circuits 64a–64d so that the input signal at the time corresponding to the address signal is held by the corresponding one of the sample-hold circuits 64a–64d. In the sample-hold circuit 21 of FIG. 3, it is necessary to hold five signals of the three-pixel correlation signals from the correlation detector time serially in accordance with the address signal. Accordingly, a sample-hold circuit 64e (not shown) should be added. Thus, the address signal 61 is of 3-bit signal and the decoder 63 produces at least five outputs.

Figure 7:
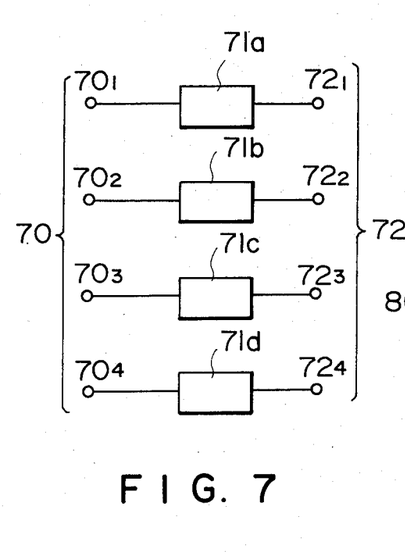
FIG. 7 shows an embodiment of an attenuator used in the processing circuit of FIG. 3.

FIG. 7 shows a block diagram of the attenuator 14 of FIG. 3. In actuality, an attenuator 71e (not shown) is added so that total of five attenuators are used. The attenuators 71a–71e attenuate the sampled and held signals applied to terminals 70 by given amounts to produce differently weighted outputs at terminals 72. Thus, when a highest correlation object is at a near distance, the attenuation to the terminal 70, to which the correlation information is applied is minimum and the attenuations to the terminals 71b–71e are sequentially increased. In the external distance measurement system of FIG. 1, the correlation signal for the near distance object in a distance range of 3–5 meters is more weighted, and in the TTL system of FIG. 2, the address signal corresponding to the anticipated focusing plane F is more weighted than that to a more distant object. That is, the signal for the address signal corresponding to the more distant object is more attenuated and the address signal corresponding to the nearer object is less attenuated.

The selection gate circuits 10b and 11b select more pixels, for example, four pixels, than the three pixels selected by the selection gate circuits 10a and 11a. They sample objects in a wider view field from the photo-electric conversion elements 2a and 2b, and the second correlation detector 20 determines the degree of matching of the four pairs. The resulting time-serial signals are converted to parallel signals by the sample-hold circuit 21 and the signals are attenuated by the attenuator 22 and supplied to the adder 15. The signals are summed for each address signal. Since the photo-electric conversion element such a CCD having seven pixels or seven-elements is used, address signals are applied to the selection gates 10b and 11b such that when the selection gate circuit 10b sequentially selects four pixels, that is, first to fourth pixels, second to fifth pixels, third to sixth pixels and fourth to seventh pixels, the selection circuit 11b selects fourth to seventh pixels, third to sixth pixels, second to fifth pixels and first to fourth pixels, respectively. Accordingly, in the selection circuits 10b and 11b as shown in FIG. 4, four analog switches having four input terminals 0–4 are sequentially selected by the address signal 41. The correlation circuit 20 shown in FIG. 5 is used, and the differential amplifier 51e (not shown) and the absolute value circuit 52e (not shown) are added to compare all of the four pixels from the photo-electric conversion elements. The four-input adder is used so that the output of the absolute value circuit 52e is applied to the additional input of the adder 53.

On the other hand, in the sample-hold circuit 21 shown in FIG. 6, four hold circuits 64a, 64b, 64c and 64d are necessary. In the attenuator 22 of FIG. 7, four attenuators 71a–71d are used. Unlike the attenuator 14, the attenuator 22 does not require that different attenuations be applied to the outputs of the sample-hold circuit 4. Therefore, the attenuator may be a constant attenuation attenuator.

Figure 10:
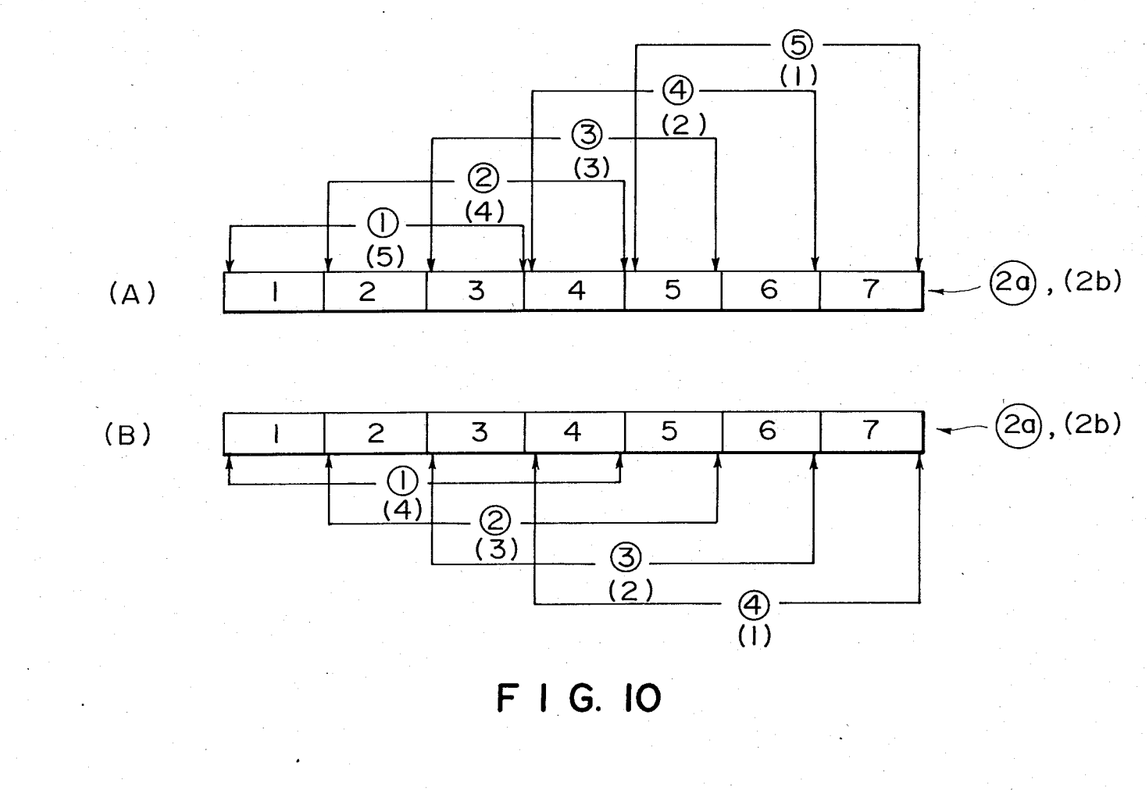
FIG. 10 shows addresses for explaining a signal produced by the adder.

Referring to FIG. 10, signals from the adders 81a–81e are explained in detail.

In FIG. 10A, in order to form the three-pixel correlation signals from the outputs of the photo-electric conversion elements 2a and 2b, the outputs of the pixels 1–3 of the element 2a and the outputs of the pixels 5–7 of the element 2b are correlated by the correlation circuit 12 at a first address ①, the pixels 2–4 of the element 2a and the pixels 4–6 of the element 2b are correlated at a second address ②, and similar correlations are made at addresses ③-⑤ to produce five correlation signals, which are held in the sample-hold circuits 64a–64e.

On the other hand, the selection gate circuits 10b and 11b produce correlations for the four pixels in a wider view field than that for the selection gate circuits 10a and 11a. FIG. 10B shows a status of the pixels to be correlated. At the first address ①, the signals of the pixels 1–4 of the element 2a and the pixels 4–7 of the element 2b are correlated by the correlation circuit 20. At the second address ②, the signals of the pixels 2–5 of the element 2a and the pixels 3–6 of the element 2b are correlated. At the third address ③, the signals of the pixels 3–6 of the element 2a and the pixels 2–5 of the element 2b are correlated, and at the fourth address ④, the signals of the pixels 4–7 of the element 2a and the pixels 1–4 of the element 2b are correlated.

Since the address signals ①-⑤ are time-serially produced by the counter 24, the correlation signals of the plurality of pixel signals are sequentially held in the sample-hold circuit.

Figure 8:
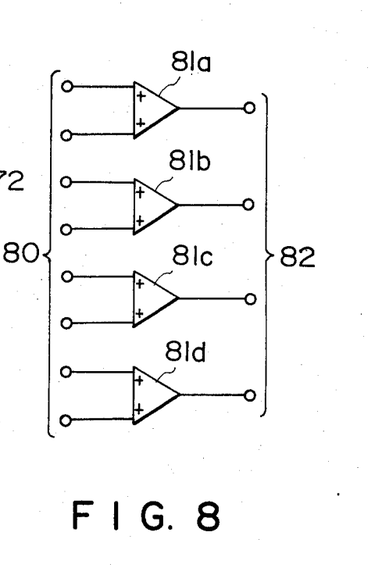
FIG. 8 shows an embodiment of an adder used in the processing circuit of FIG. 3.

Adders 81a–81d shown in FIG. 8 sum the correlation signals produced at the addresses ①-④. The adder 81a sums the correlation signals held by the sample-hold circuits 21 and 13 at the address ①, the adder 81b sums those at the address ②, the adder 81c sums those at the address ③ and the adder 81d sums those at the address ④. At the address ⑤, only the outputs of the narrow view field selection gate circuits 10a and 11a are produced and the correlation signals for the photo-electric conversion elements 2a and 2b are produced but the outputs of the wide view field selection gate circuits 10b and 11b are not produced and the correlation signals produced at the address ④ are used in substitution. An adder 81e (to be described later) sums those signals, that is, the narrow view field correlation signals and the substitution signals. In the addition operation, the signals applied to the terminals 80 from the attenuators 14 and 22 are summed by the adders 81a–81d for each address signal.

Figure 9:
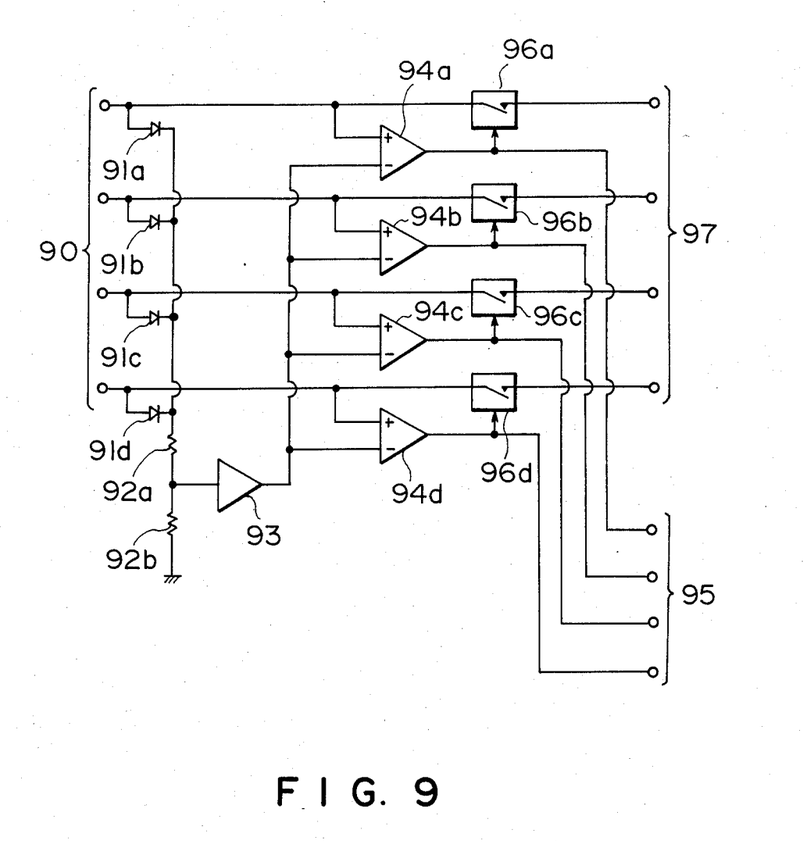
FIG. 9 shows an embodiment of a selection circuit used in the processing circuit of FIG. 3.

Of the parallel analog signals from the adder 15, only the largest signal is selected by the maximum value selection circuit 16. FIG. 9 shows the selection circuit 16. Of the input signals applied to terminals 90, a maximum signal is produced at an output terminal of a diode 91 by diodes 91a–91d and resistors 92a and 92b and a potential divided by the resistors 92a and 92b. For example, the maximum value ×0.9 is produced by a buffer 93, and it is compared with the input voltages by comparators 94a–94d. For example, the comparators 94a–94d produce high level outputs at digital output terminals 95 for the inputs larger than the maximum value ×0.9, and analog switches 96a–96d are turned on by the high level outputs to transmit the input signals of the terminals 90 to analog output terminals 97.

In FIG. 3, the digital signals at the digital output terminals 97 of FIG. 9 are produced as the output of the maximum value selection circuit 16, which is supplied to the priority encoder 17 which preferentially processes the near object to produce the address signal corresponding to the highly matching signal.

In FIG. 8, four adders are provided. In actuality, since the sample-hold circuit 21 produces five outputs as a result of checking the correlation of the objects in the narrow view field three pixels at a time, the attenuator also produces five outputs. Accordingly, one more adder 81e (not shown) must be provided in FIG. 8, and one more input must be added to the maximum value selection circuit 16 of FIG. 9. The actual circuit will be apparent from the circuit shown in FIG. 9 and hence it is not shown.

The output of the counter 24 is applied to the respective circuits. That is, the address signals ①–⑤ are applied to the selection circuits 10a, 11a, 10b and 11b and the sample-hold circuits 21 and 13 such that the corresponding pixels are correlated three pixels at a time by the correlation detector 12 and four pixels at a time by the correlation detector 20, in synchronism with the readout of the photo-electric conversion elements 2a and 2b.

Thereafter, a clearing circuit (not shown) applies a reset signal to the counter 24, the photo-electric conversion elements 2a and 2b and the sample-hold circuits 13 and 21 to reset those circuits to the initial states. Then, the counter 24 again produces the address signal. The display device 4 (FIG. 1) displays the distance information for a predetermined time period by the driver 18 or the analog output of the D/A conversion amplifier 19, or the motor 8 of the imaging lens 5 (FIG. 2) is driven.

In the above arrangement, the five correlations produced by the sample-hold circuit 13 represent the correlations in the three-pixel narrow view field for the first to third pixels of the photo-electric conversion element 2a and the fifth to seventh pixels of the element 2b. In other words, when the correlation is maximum, it means that an infinite (very far) object is present. Then, the correlations of the second to fourth pixels of the element 2a and the fourth to sixth pixels (2b) of the element 2b are checked. If a maximum correlation is detected, it means that an object is present at a far position. Similarly, the correlation of the third to fifth pixels, of the element 2a and the third to fifth pixels of the element 2b, then the fourth to sixth pixels of the element 2a and the second to fourth pixels of the element 2b, and then the fifth to seventh pixels of the element 2a and the first to third pixels of the element 2b are checked. Thus, by checking the correlations in this manner, the presence of the objects in five zones in the narrow view field, from the infinite position to the very near position can be determined, and the correlations in the respective zones are held in the sample-hold circuit 13.

Since the attenuations for those five zones gradually increase starting from the very near zone by the attenuator 14, the nearer the object is, the less is the correlation attenuated, that is, the more is the correlation emphasized. Similarly, the sample-hold circuit 21 holds the correlations of the objects in four zones, that is, a first zone between finite and far position, a second zone between the far position and an intermediate position, a third zone between the intermediate position and a near position, and a fourth zone between the near position and a very near position.

As described above, the two correlation detectors 12 and 20 are provided and the one correlation detector 12 sequentially detects the correlations of the objects in the narrow view field three pixels at a time and they are added to the correlations of the objects in the wide view field to compare the correlations. This is further explained below.

In FIG. 1, it is assumed that a contrast of the tree $S_2$ at the far position is higher than a contrast of the human $S_0$ at the very near position, and contrasts of the house $S_1$ and the mountain $S_3$ are higher in this order. As the selection gate circuits 10a and 11a sequentially correlate the outputs of the photo-electric conversion elements 2a and 2b three pixels at a time, the correlation information of the house $S_1$ (intermediate distance), the human $S_0$ (very near distance), the tree $S_2$ (far distance) and the mountain $S_3$ ($\infty$) are sequentially sampled and held by the sample-hold circuit 21 and they are attenuated by the attenuator. Since the attenuator more attenuates the correlation information of the farther object, the correlation of the human $S_0$ after the attenuation may slightly be larger than the correlation of the house $S_1$ after the attenuation, depending on the difference between the initial correlations and the setting of the attenuation. The adder 15 adds the correlations in the wide view field to the correlations in the narrow view field.

As a result, in the sum produced by the adder 15, the correlation for the human at the near distance is emphasized. For the objects of FIG. 1, the correlation for the near zone (between the far near point and the near point) is larger than the correlations for the intermediate zone (between the intermediate point and the far point) and the far zone (between the far point and the infinite), the largest correlation is added to the correlations in the narrow view field.

In the above embodiment, the seven-pixel photo-electric conversion elements are used, but by using more finely divided elements such as 300–500 pixel or more than 1000-pixel elements, the pixels are more precisely divided and more precise distance information can be obtained while three and four pixels are included in the correlation fields in the above embodiment, any number of pixels may be used as required.

Thus, by adding the correlation for the wider area to the correlation for the narrower area, the distance can be measured more precisely, and by using the analog signal of the maximum value selection circuit 16, the correlation for the wider area is added only to the large correlation for the narrower area or the correlation for the wider area can be detected dividedly at different times by the selection gate circuits 10a and 11a and the first correlation detector 12.

The distance information thus measured is applied to the display 4 of FIG. 1 through the display driver 18 to display the defocus amount or the distance to the object, or it may be applied to the driver 8 through the D/A conversion amplifier 19 to produce a zero output when the address signal corresponding to the anticipated focusing plane F shown in FIG. 2 is produced to effect an automatic focusing operation.

In the above embodiment, the analog circuit is used. Alternatively, the photo-electric outputs of the image may be A/D converted and the correlation may be determined by a microprocessor. In this case, the correlation for the narrower area is first calculated, the correlation for the wider area is determined for the large weighted correlation and the distance is determined based on that information. As a result, a time-consuming correlation operation for the wider area can be omitted to obtain a fast processing and stable distance measurement and automatic focusing operation can be obtained even when far and near objects coexist. When the analog circuit is used, the calculations for the narrower area and the wider area may be done by a common circuit in a time division fashion to reduce a circuit scale.

As described hereinabove, in accordance with the distance detection apparatus of the present invention, the correlation for the narrower area is determined in a rapid and simple manner to prevent the error due to the coexistence of the near and far objects, and the correlation for the wider area is added to the above information to prevent the error due to analoguous narrow area patterns so that fast and precise distance measurement is attained as a whole.

Figure 11:
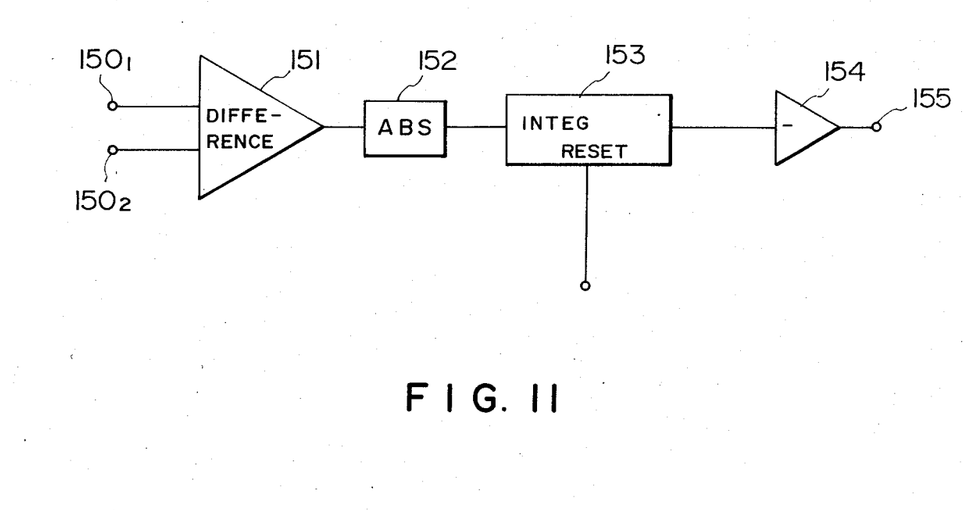
FIG. 11 shows a block diagram of another embodiment of the correlation detector used in the present invention.

The correlation detector shown in FIG. 11 may be used as the correlation detectors 12 and 20 of FIG. 3. In FIG. 11, numeral 151 denotes a differential amplifier, numeral 152 denotes an absolute value circuit, numeral 153 denotes an integration circuit and numeral 154 denotes an inverter. Connected to two inputs $150_1$ and $150_2$ of the differential amplifier 151 are a known multiplexer (not shown) such as the circuit shown in FIG. 4 so that the inputs $A_1$, $B_1$, $A_2$, $B_2$, $A_3$, $B_3$, . . . are sequentially applied by the multiplexer as the time-serial signals. The integration circuit 153 is initialized by the reset signal at the start of the integration, and a difference between the two inputs from the absolute value circuit 152 is integrated in the integration circuit 153 which produces an analog signal representing the correlation at an output 155.

Figure 12:
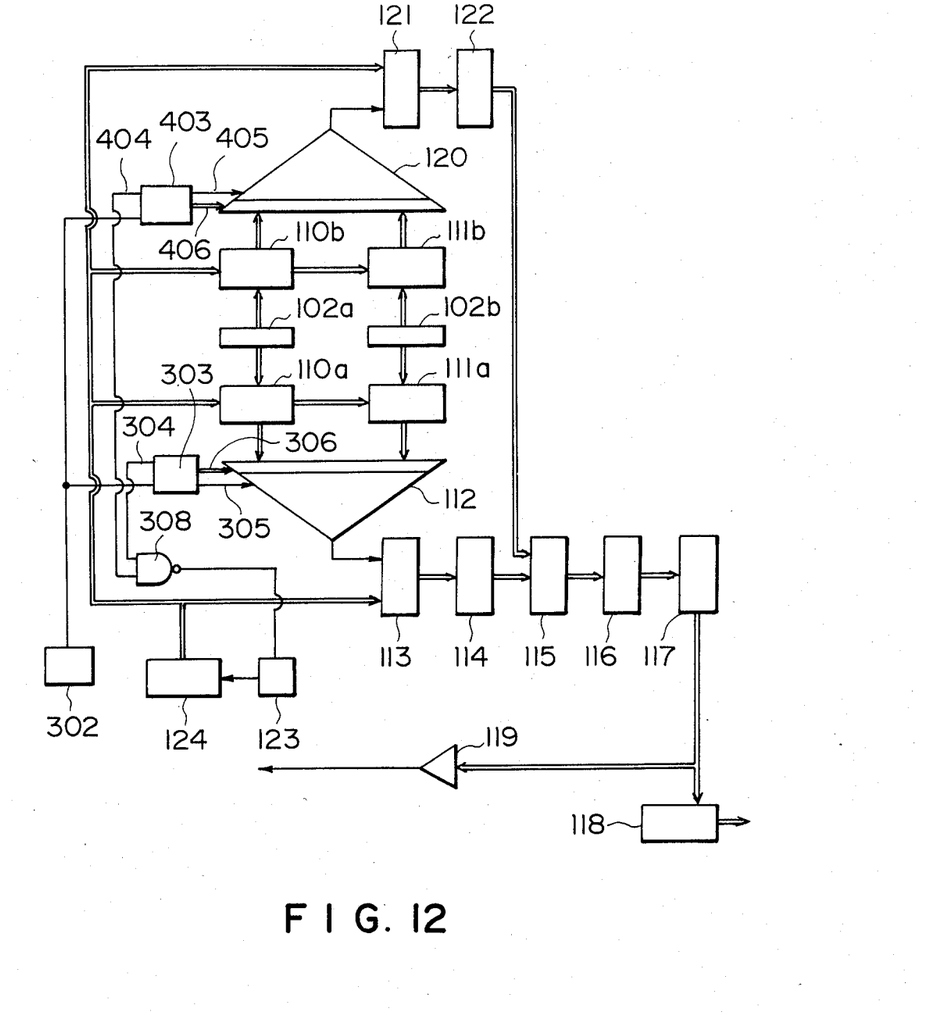
FIG. 12 shows a modification of the present invention which uses the correlation detector of FIG. 11.

FIG. 12 shows a modification of the processing circuit which uses the correlation detector shown in FIG. 11, in which those elements which are similar to those shown in FIG. 3 are designated by like numerals with 100 added thereto. Those circuits are not explained here. Numeral 302 denotes an oscillator, and numeral 303 denotes a counter. Each time the counter 303 counts up the signal from the oscillator 302, three pairs of signals are integrated by the integration circuit 153 through the absolute value circuit to determine the correlations of the three-pixel signals of the photo-electric conversion elements 102a and 102b, by the multiplexer connected to the inputs of the differential amplifier 151, and it is held in the sample-hold circuit 113. Then, the integration circuit 153 is reset. The above operation is repeated to sequentially produce five correlation signals for the three pixels and they are held in the sample-hold circuit 113. (See the explanation for FIG. 10.) When fine correlation signals have been produced, the counter 303 produces a high level signal at the terminal 305 to reset the integration circuit 153. Numeral 308 denotes a NAND circuit which, each time the three pairs of signals are selected by the multiplexer, responds to a high level signal from the terminal 304 to trigger the oscillator 123 so that next three pairs of pixel signals are selected from the photo-electric conversion elements.

Numeral 403 denotes a counter used to time-serially select four-pixel correlations, numeral 404 denotes a terminal at which an end signal is produced each time four-pixel pairs are selected, and numeral 405 denotes an integration circuit reset signal terminal.

With the arrangement of the processing circuit described above, the correlation detector, unlike that of the parallel processing circuit of FIG. 5, produces the pixel signal pairs time-serially. Accordingly, the correlation circuit may be of simple configuration.

Figure 13:
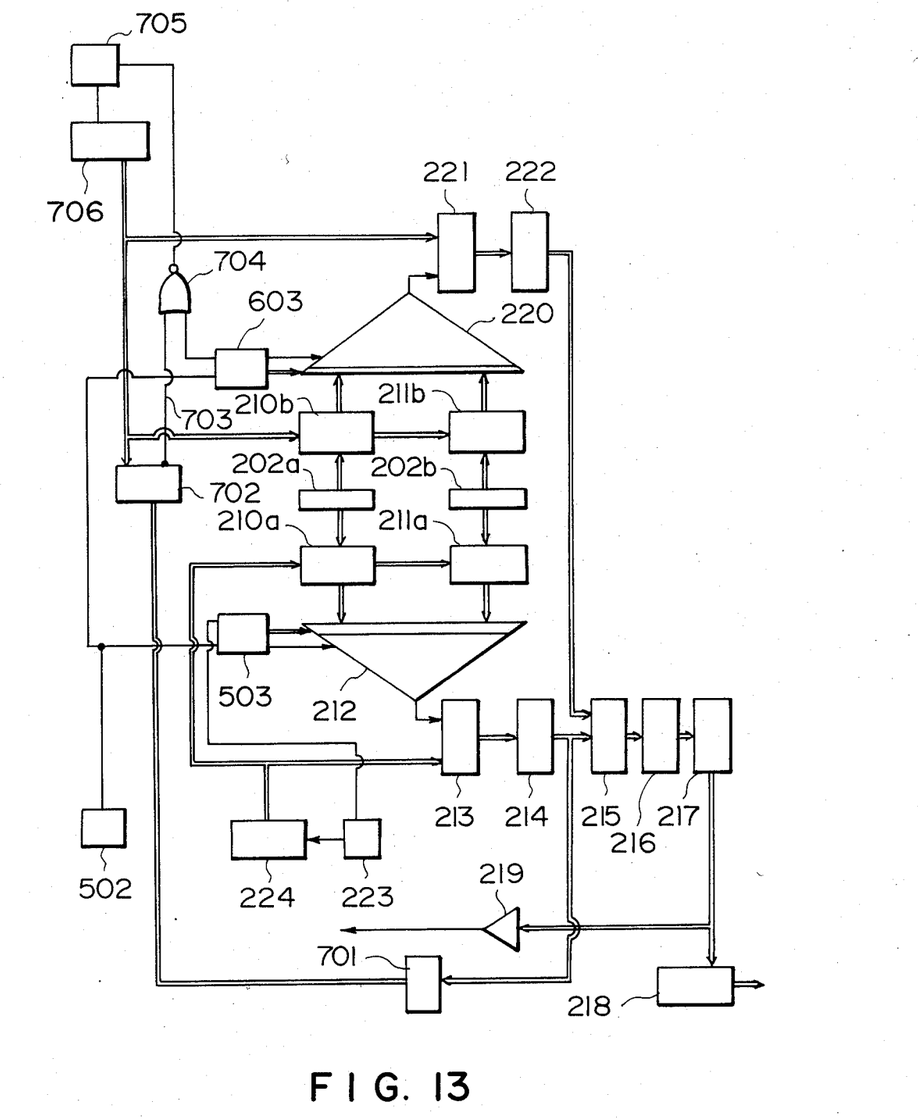
FIG. 13 shows another modification which uses the correlation detector of FIG. 11.

FIG. 13 shows another modification in which the correlation for the wider view field is determined only when the correlation output for the narrower view field (three-pixel correlation) is large so that the calculation time is shortened. Numerals 503 and 603 denote counters similar to the counters 303 and 403, and numeral 502 denotes an oscillator. Other circuits which are similar to those of FIG. 3 are designated by the same numerals as those used in FIG. 3 with 200 added thereto. Numeral 701 denotes a detector which detects a maximum signal among the outputs of the attenuator 214 and produces a high level output when the maximum signal is detected. It may be a similar circuit to the circuit 16 of FIG. 3. Numeral 702 denotes a data selector. When an output of the detector 701 is lower than a predetermined level, that is, when the correlation for the narrow view field is low, the data selector 702 produces a high level signal at an output terminal 703 to render an output of a NOR gate 704 to be low to activate an oscillator 705 and a counter 706. A sample-hold circuit 221 is cleared by an address signal so that the correlation operation is not carried out in the circuit 221. Accordingly, the correlation operation for the wide view field is omitted. On the other hand, when the correlation for the narrow view field is large, the operation of the oscillator 705 is stopped by the NOR gate 704 and the counter stops its count. Thus, the positions for the correlation calculation on the photo-conductive conversion elements 202a and 202b are designated by the address signals of the counter 706 applied to the selection gate circuits 210b and 211b. Then, the correlation operation for the wide view field is carried out by the counter 603.

In the present embodiment, the correlation operation for the wide view field is carried out only when the correlation for the narrow view field is large. Since the correlation operation for the wide view field is carried out only when it is required, the operation time is reduced, the processing time is reduced and the distance information detection time is reduced. Further, since the correlation for the narrow view field and the correlation for the wide view field are combined to detect the distance information, highly reliable information is obtained.

What is claimed is:

1. A distance detection apparatus for measuring the distance to an object, comprising:
   sensor means including a plurality of light sensitive elements for receiving radiation from the object and for outputting electrical signals;
   a correlation detection circuit for detecting the correlation of the electric signals from predetermined groups of said light senitive elements and for forming signals respectively corresponding to information representing at least three different distances in a view field containing said object;
   means for weighting said signals formed by said correlation detection circuit with different weight factors respectively corresponding to the distance information to which the signals correspond, and putting out weighted signals representing said weighting; and detection means for detecting the signal among the weighted signals output by said weighting means and having a peak value.

2. A distance detection apparatus according to claim 1 wherein said weighting means weights the signals formed by said correlation detection circuit with larger weight factors as the distance to the object decreases.

3. A distance detection apparatus for measuring the distance to an object, comprising:
a signal processing circuit for forming signals respectively corresponding to information representing at least three different distances in a view field containing said object;
means for weighting said signals formed by said signal processing circuit with different weight factors respectively corresponding to the distance information to which the signals correspond, and putting out weighted signals representing said weighting; and
detection means for detecting the signal amount the weighted signals output by said weighting means and having a peak value said detection means includes:
(A) operation means for putting out second signals each of which corresponds to one said signal formed by said signal processing circuit and one said weighted signal output by said weighting means, both of which correspond to the same distance information; and
(B) detecting means for detecting the second signal output by said operation means and having a peak value.

4. A distance detection apparatus according to claim 3 wherein said operation means includes an adder for adding the weighted signals output by said weighting means to the signals formed by said signal processing circuit.

5. A distance detection apparatus according to claim 3, wherein said weighting means includes an attenuator for attenuating said signals formed by said signal processing circuit, the amounts of the attenuation by said attenuator of each said signal being different from one another in accordance with said signals respectively corresponding to said different distance information.

6. A distance detection apparatus for producing distance information relating to an object, comprising:
(A) a pair of sensor means having photosensitive planes to which radiation from the object may be applied, said radiation being distributed in such a pattern that a relative position on the photosensitive plane of said sensor means varies in accordance with the distance of the object;
(B) a correlation detection circuit connected to said sensor means for producing correlation signals representing the relative position of the distribution of radiation to said sensor means based on the outputs of said sensor means;
(C) a processing circuit connected to said correlation detection circuit for processing the outputs of said correlation detection circuit to form distance signals respectively corresponding to at least three distances in a view field containing said object, said processing circuit including means for weighting said distance signals with different weight factors respectively depending on said distance signals corresponding to said distances, and for putting out said weighted signals;
(D) detection means for detecting the weighted signal output by said processing circuit and having a peak value; and for producing an output representative thereof; and
(E) means for producing a final distance signal in accordance with the output of said detection means.

7. A distance detection apparatus according to claim 5 wherein said weighting means applies weight factors that decrease as said distance signals indicate greater distance.

8. A distance detection apparatus according to claim 6, wherein each of said pair of sensor means includes a sensor array comprising a plurality of photoelectric sensor elements each forming an electric signal, and read-out means connected to said sensor array for serially reading out electric signals formed by each said sensor element; and wherein said correlation detection circuit detects correlation of said electric signal formed by a predetermined number of sensor elements included in each said sensor array.

9. A distance detection apparatus for producing distance information relating to an object, comprising:
(A) a pair of sensor means having photosensitive planes to which radiation from the object may be applied, said radiation being distributed in such a pattern that a relative position on the photosensitive plane of said sensor means varies in accordance with the distance to the object;
(B) a detector connected to said sensor means for producing correlation signals representing relative positions of the distribution of radiation applied to said sensor means based on the outputs of said sensor means;
(C) a processing circuit connected to said detector for processing the outputs of said detector to form distance signals respectively corresponding to at least three distances in a view field containing said object, said processing circuit including means for weighting said distance signals with different weight factors respectively depending on said distance signals corresponding to said distances, and for putting out said weighted signals;
(D) detection means for detecting the weighted signal output by said processing circuit and having a peak value; and for producing an output representative thereof; and
(E) means for producing a final distance signal in accordance with the output of said detection means;
wherein each said sensor means includes a number of sensor elements each for forming an electric signal, and wherein said detector includes
a control circuit connected to each said sensor means for reading out electric signals formed by the elements thereof;
a first correlation detector for producing a correlation signal for each element signal sequence in a first range of the element signals;
a second correlation detector for producing a correlation signal for each element signal sequence in a second range larger than the first range;
said processing circuit being connected to said first correlation detector, and said detection means includes a circuit for referencing the correlation signals from said second correlation circuit.

10. A distance detection apparatus according to claim 9 wherein said weighting means includes at least three attenuators each of which attenuates one distance signal.

11. An apparatus for producing distance information relating to an object based on signals from sensor means for receiving radiation from the object, comprising:
- (A) a signal processing circuit for producing signals respectively corresponding to information representing at least three different distances in a field containing said object;
- (B) first detection means for detecting distance information in the view field containing said object in each of a plurality of narrow fields for the object;
- (C) second detection means for detecting distance information in the view field containing said object in each of a plurality of wide fields for the object; and
- (D) selection means for selecting distance information detected by said first detection means, said selection means also selecting distance information detected by said second detection means.

12. A distance detection method of measuring distance to an object, comprising the steps of:
correlating electrical signals from plural light sensitive elements which receive radiation from the object and forming signals respectively corresponding to information representing at least three different distances in a view field containing said object;

weighting said formed signals with different weight factors respectively depending on said three different distances respectively corresponding to said formed signals; and detecting the weighted signal having a peak value among said weighted signals.

13. A method for producing distance information on the distance to an object, comprising the steps of:
- (A) detecting distance information related to the object in each of a predetermined plurality of fields for the object by correlating electrical signals from plural light sensitive elements which receive radiation for the object;
- (B) weighting the distance information in accordance with a predetermined function such that specified distance information is more weighted than other distance information; and
- (C) detecting a peak value of said weighted distance information and outputting the distance information with detected peak value.

* * * * *